Dec. 25, 1962

E. B. HITCHCOCK

3,070,398

CAN CARRYING APPARATUS

Filed Aug. 10, 1959

INVENTOR.
EUGENE B. HITCHCOCK
BY

ATTORNEY

Dec. 25, 1962  E. B. HITCHCOCK  3,070,398
CAN CARRYING APPARATUS
Filed Aug. 10, 1959  4 Sheets-Sheet 2

INVENTOR.
EUGENE B. HITCHCOCK
BY
George H. Baldwin
ATTORNEY

Dec. 25, 1962

E. B. HITCHCOCK 3,070,398

CAN CARRYING APPARATUS

Filed Aug. 10, 1959

INVENTOR.
EUGENE B. HITCHCOCK
BY
George H. Baldwin
ATTORNEY

United States Patent Office 3,070,398
Patented Dec. 25, 1962

3,070,398
CAN CARRYING APPARATUS
Eugene B. Hitchcock, Longwood, Fla., assignor to Can-Rite, Incorporated, Longwood, Fla., a corporation of Florida
Filed Aug. 10, 1959, Ser. No. 832,600
12 Claims. (Cl. 296—24)

This invention relates to a commodity carrying assembly. More particularly the invention relates to a compartment assembly especially adapted for use in the handling and hauling of metal containers such as the familiar cylindrical cans employed as containers for food and the like.

The empty tin cans employed in the food preservative industries are preferably hauled from the can fabricator to the canning factories in a loose or unboxed condition. In many cases the canned commodities are also hauled to the various points of intermediate distribution in a loose or unboxed condition. This presents problems in the handling and hauling of the cans since it is desirous to load and unload the transporting vehicles quickly and with as little manpower as possible. Additionally and to minimize can damage and conserve space in the vehicles employed for hauling the cans, it is desirous to orient the cans in the vehicles. Another problem which confronts those in the business of hauling cans is that of employing the same equipment for the handling and hauling of cans of various sizes on the same occasion or on successive load hauling occasions.

Still another object is to provide a compartmented assembly which enables easy loading and unloading thereof with cans and which facilitates the orientation of the cans within the device to thereby conserve load-hauling space.

Another object is to provide a compartment assembly which enables the efficient hauling and handling of cans of different sizes simultaneously or on successive occasions.

Another object is to provide an assembly which is designed to handle cans of different sizes on successively different occasions or on the same occasion and which therefore may be employed continuously throughout the year for the hauling of cans of one size during one period and cans of another size during the next period.

A specific object is to provide an assembly which is divided into compartments that may be varied in size to receive cans of different sizes on successive occasions, and which compartments are easily loaded and unloaded mechanically, and which furthermore is so designed as to be easily and relatively inexpensively fabricated and employed for the handling and hauling of cans.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
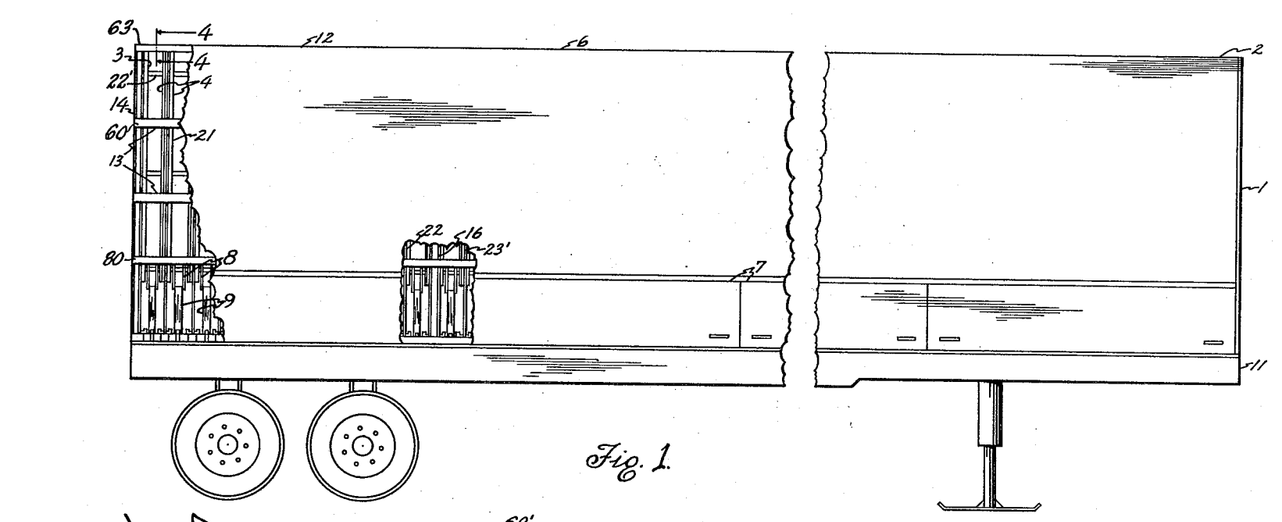
FIG. 1 is a side elevational view of a trailer embodying the novel construction of the invention, certain parts being broken away to show the interior compartments and certain details of the side wall construction.
Figure 2:
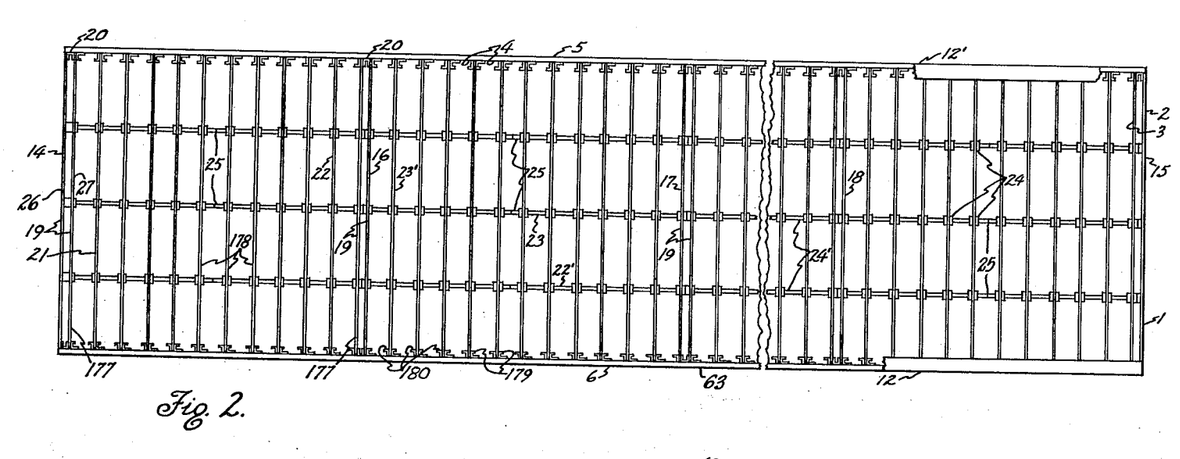
FIG. 2 is a top view of the embodiment shown in FIG. 1 and further illustrates certain details of the compartmented interior construction.

With particular reference to FIGS. 1 and 2, the embodiment incorporating the invention is shown in the form of a load-hauling trailer which is generally designated at 1. The trailer has an open top portion 2 which may be suitably covered in use and is divided in the interior 3 into a plurality of narrow transversely extending compartments 4 which extend between the opposite side walls 5 and 6 of the van body. The van body and in particular each compartment is loaded through the open top 2 and the walls 5 and 6 are provided with removable doors 7 along their lower portions. Access is gained to the respective compartments 4 through the removable doors for unloading purposes and for making suitable adjustments for relocating the partitions. Each of the compartments 4 is provided with a gate assembly 8 which is located inwardly of and immediately behind the doors 7. The gates 9 of the assemblies 8 are adapted to retain the cans in the compartment until the gates 9 are released in a manner to be described hereinafter.

The opposite side walls 5 and 6, of the van body extend upwardly from respective base plate members, such as member 10. The base plate members extend along the side edges of and are suitably connected to an elongated rectangularly shaped flat bed assembly 11 that forms the floor of the van body. The side walls 5 and 6 and the partitions are physically attached to the floor forming flat bed 11 only through the side plate members such as member 10. The side wall panels 12' and 12 of the respective side walls 5 and 6 are disposed against and suitably attached to longitudinally extending ribs 13. The ribs 13 are supported spacedly above the respective base plate members and are releasably connected to the partitions including the double walled partitions 177, such as end partitions 14 and 15 and intermediate partitions such as 16, 17 and 18. The sheet members 19 of the double walled partitions are spaced at their opposite ends by means of upstanding and inwardly opening U-shaped members 20 which, through suitable releasable connections to the ribs 13, function as posts in supporting the ribs of the respective walls in vertical spaced relationship above the floor 11.

In addition to the double walled partitions 177 which hereinafter will be called "master" partitions, the interior of the van body assembly is provided with a plurality of single wall partitions 178 such as partitions 21, 22 and 23'. These partitions extend between and are also releasably connected to the opposite side walls 5 and 6 of the van body. Inwardly of the side walls 5 and 6, all of the partitions, both master partitions and single wall partitions, are interconnected and spaced longitudinally of the van body along longitudinally extending tie rods 24' such as rods 22' and 23, by means of suitable connectors which are generally designated at 24. The tie rods pass through the partitions and are provided with respective joints 25 between master partitions so as to facilitate assembly of the apparatus.

Figure 3:
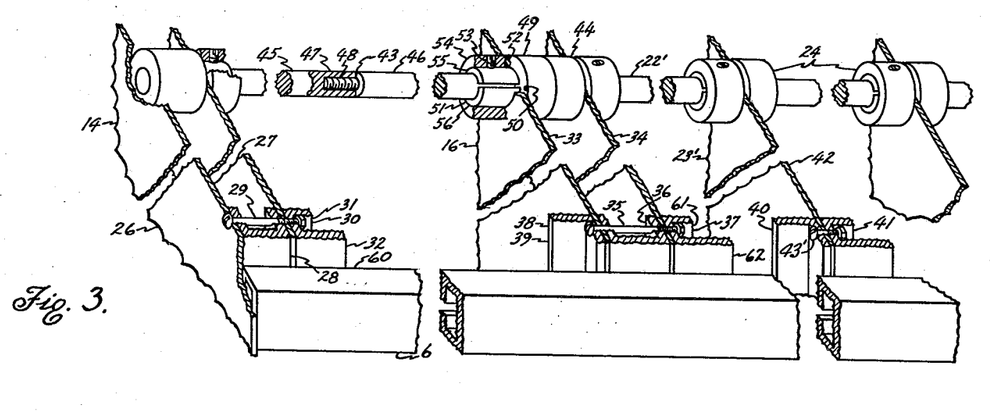
FIG. 3 is an enlarged fragmentary perspective view showing details involved in the interior spacing and assembly of the compartment defining partitions.

The side wall abutting end constructions of the partitions and the means by which they are secured to the tie rods are illustrated in FIG. 3. With respect to end master partition 14, it will be seen in FIG. 3 that the partition is provided with two parallel metal sheet members, 26 and 27, which are spaced at their side wall contacting ends by an inwardly opening U-shaped member 28 which, as previously mentioned, functions as a wall supporting post through a suitably releasable connection to the ribs 13. The sheets 26 and 27 are rigidly fastened to side wall post forming member 28 by means of suitable metal fasteners such as the bolt and nut shown at 29. Sheet 26 functions as the rear end wall covering for the van body and extends laterally of member 28 to lap the ends of the ribs 13, as shown with respect to hollow box rib member 60 in FIG. 3. Also attached to and forming a part of the end master partition 14 is a vertically extending member 30 which abuts the forward face of sheet 27 adjacent the side wall and which is also rigidly secured to the sheets by means of the metal fastener shown at 29. As will be subsequently evident the lower end of member 30 terminates spacedly above the floor of the van body. Member 30 is provided with integrally formed and forwardly projecting spaced flanges, 31 and 32, the former of which lies inwardly of the latter and functions when the adjacent compartment is loaded as a can stop. Flanges 32 on the other hand butts against the ribs, as, for example, rib 60, and serves in a manner to be described hereinafter in connecting the partition 14 to the upstanding side wall 6.

With respect to the intermediate master partition 16 that is shown in FIG. 3, this partition is also provided with two parallel sheets 33 and 34 which are interconnected at their ends by means of fasteners such as metal fastener 35 that extend through the sheets 33 and 34 and through the intervening flanges of the inwardly opening and upstanding U-shaped member 36. Member 36 serves the same function as member 28 of end master partition 14. Partition 16 is provided with a vertically extending end member or framing element 37 that overlies an end portion of the forward face of sheet 34 adjacent to rib 60. The function and shape of member 37 is the same as that of member 30 and it will be seen in FIG. 2 that each of the partitions is provided with a similar double flange member or framing element as generally illustrated at 179. The inward flange 61 of member 37 serves as a cooperating can stop and flange 61 facilitates the attaching of the partition 16 to the side wall ribs. Coextensive in length with member 37 and attached to the rear face of sheet 33 adjacent to the side wall 6 is a vertically extending elongated L-shaped member or framing element 38 which is also secured to the sheets by fasteners such as fastener 35. Member 38 has a flange 39 which projects rearwardly of the sheet 16 and which is spaced inwardly of the side wall 6. This flange 39 functions as a can stop also and cooperates with the forward projecting can stop flange of the next adjacent and rearwardly positioned partition in preventing the direct exertion of lateral force by the cans in the compartment against the side wall ribs or overlying panel. Again by reference to FIG. 2 it will be seen that each of the partitions except end partition 15 is provided with a member or element like member 38 as generally shown therein at 180. Members 40 and 41 are fixedly secured on opposite sides of the single sheet 42 of partition 23' by fastening means which include the bolt and nut shown at 43'.

As previously mentioned, the rods are composed of sections which are joined between master partitions, as at joint 43. Thus sections 45 and 46 of rod 22' are provided with threadedly engageable female and male end portions, 47 and 48 respectively.

The partitions are provided with holes through which the rods extend and are attached to the rods by means of connectors 24 which fit around the rods as shown in FIG. 3. The construction of the connectors is illustrated by connector 44 which is composed of a bushing 49 and a set screw 53 containing collar 54 which engages and firmly holds the bushing on the rod 22'. The bushing 49 loosely fits around the rod 22' and has an enlarged shoulder 50 that is disposed against the forward face of sheet 33 and a split shank 51 that extends rearwardly through the rod receiving hole 52 in the sheet 33 to extend beyond the rear face of the sheet. The collar 54 fits around the shank 51, and the opposite legs 55 and 56 of the shank 51 are forced together into clamping relationship about the rod 22' when set screw 53 is firmly tightened down in collar 54. As such the sheet 33 is retained between the shoulder 50 and the collar 54 of the connector 44. As shown in FIG. 3, the intermediate master partitions such as partitions 16 employ two connectors which respectively have their shoulders disposed in end abutting relationship between the sheets, as for example between sheet 33 and 34, so that the associated collars are readily accessible for manipulation of the set screws therein. The end master partitions and single walled partitions employ but one connector which are similarly constructed and manipulated.

Figures 4, 5:
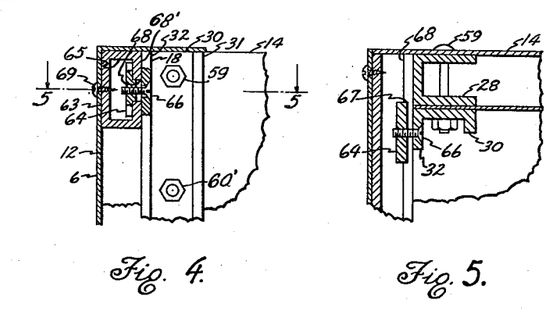
FIG. 4 is an enlarged fragmentary section view along the lines 4—4 of FIG. 1.
FIG. 5 is a section view along the line 5—5 of FIG. 4.

The means employed for securing the partitions to the side wall ribs is illustrated in FIGS. 4 and 5 with respect to end master partition 14 and the top rib 63 of side wall 6. As illustrated by rib 63, the longitudinally extending ribs 13 are rectangular C-shaped members in the form of a hollow box when viewed in cross section and each has a slot such as a slot 68 which passes through a side wall 68' of the box member and which opens inwardly toward the ends of the partitions. End master partition 14, like each of the other master and single wall partitions, is provided with a vertically extending end member 30 which is rigidly secured to the partition 14 by means of fasteners such as fasteners 59 and 60'. These end members are each provided with an outer flange, like the flange 32 of member 30, that abuts against the slotted inner faces of the ribs, such as rib 63. The releasable connection between the ribs and partitions is accomplished by a rib fastener assembly 181. Thus, a shoe 64 is provided within the hollow portion 65 of the rib 63 which is engaged by and serves as a nut for a bolt 66 which passes through the flange 32 of member 30 and threadedly engages the shoe which thus seats against the wall 68' on both sides of the continuous slot 68. The shoes, as illustrated by shoe 64, are preferably provided with a projecting lip 67 which fits into the slot 68 of the rib 63 and lends rigidity to the rib in the regions adjacent the slot. It will be understood, of course, that a similar rib fastener is employed at the abutting intersection of each rib with members 30.

It will also be noted in FIG. 4 that side wall panel 12 is attached to the ribs as by means of screw 69 and that the panel 12 extends over the top of the upper side wall rib 63 to lap the upper ends of the vertically disposed members, such as members 30 and 28.

Figure 6:
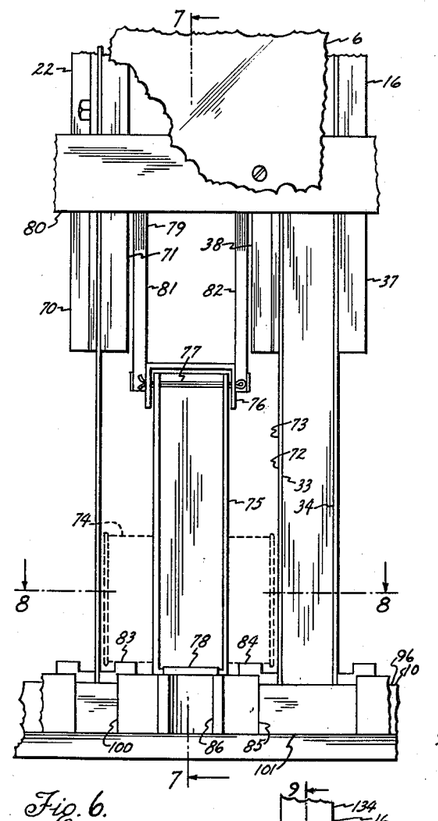
FIG. 6 is an enlarged fragmentary side elevational view of one of the compartments shown in FIG. 1, certain parts being broken away to illustrate details involved in the side wall supporting framework.

FIG. 6 further illustrates construction details of the master and single wall partition assemblies. As shown therein the vertically extending L-shaped end members 70 and 38 of partition 22 and 16 respectively and the double flanged end members 71 and 37 of partitions 22 and 16 respectively, the latter of which are utilized in attaching the partitions to the wall, terminates at their respective downward extremities spacedly above the elongated base plate members 10. As such each compartment is provided with an opening which is laterally accessible at the bottom of the wall as illustrated by the opening 72 through side wall 6 into compartment 73. When the compartments are loaded with cans the cans are removed through these openings.

As illustrated by can 74 in compartment 73, the cans are prevented from passing through the openings in the compartments by respective gates, such as gate 75 which obstructs the openings 72 into compartment 73. Gate 75 is suitably pivotally attached to a hinge 76 at its upper end by a cotter pin 77 and depends therefrom to its lower end which, when the gate is closed, engages the inner face of an upstanding lip 78 on an indexing element 85 that is releasably secured to base plate 10. Hinge 76 in turn is mounted between the arms 81 and 82 of a bracket 79 which is disposed inwardly of and mounted on rib 80. Indexing element 85 cooperates with a can receiving boot in a manner to be described hereinafter. It will be noted, however, that the indexing element 85 is provided with a facial recess 86 in an outer portion 100 thereof which portion overlies the outer face 101 of the body portion 96 of rail 10, immediately beneath the opening 72 into compartment 73.

It will also be noted in FIG. 6 that the cans at the bottom of the compartment 72, as exemplified by can 74, rest upon upstanding rails 83 and 84 which, as will be shown subsequently, are attached to and form a part of partition 22 and 16 respectively. Member 36 which separates sheets 33 and 34 and to which the sheets are attached rests on base plate 10 and as previously mentioned extends upwardly therefrom to form a supporting post for the side wall 6.

Figure 7:
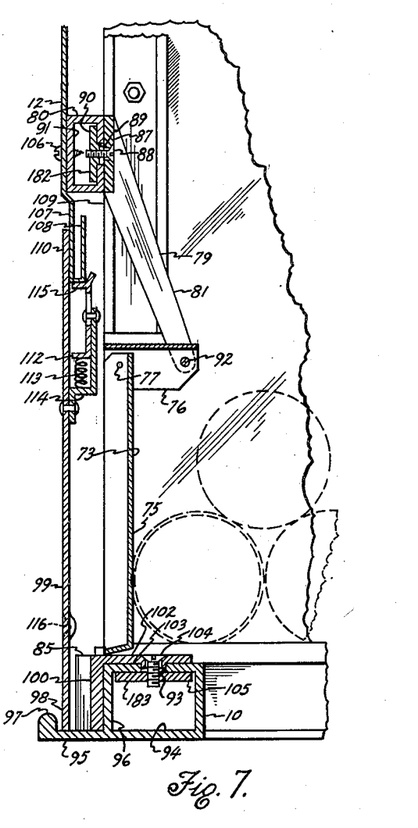
FIG. 7 is a section view taken along the line 7—7 of FIG. 6.

The details of the door construction and the hinge assembly are best shown in FIG. 7 wherein it will be noted that bracket 79 is provided with an upper plate 87 which is rigidly and releasably secured to hollow box rib 80 by means of a bracket fastening assembly 182 which consists of a bolt 88 that passes through the plate 87 and through the slot 89 in rib 80 and a shoe 90 which is confined within the hollow 91 of the rib and with which the bolt is threadedly engaged. This releasable attachment for the hinge bracket is of substantially the same type as that employed for securing the partitions to the ribs. The arms of the bracket 79, as shown by arm 81, depend from the plate 87 and extend slightly into the compartment 73 to the pivotal connection 92 with hinge 76. Hinge 76 in turn extends outwardly from pivot 92 to the pivotal connection 77 with gate 75. The base plate 10 has a shape similar to that of the ribs except that the slot 93 which opens into the hollow portion 94 of the plate 10 is in the upper face of the base plate and opens upwardly. The plate is additionally provided with a laterally extending flange 95 which terminates spacedly outwardly of the body 96 of the plate 10 in an upstanding rail 97 which serves as a retaining members for the lower end 98 of door 99 and as a rail for an unloading boot to be subsequently described.

The indexing element 85 has an outer portion 100 which depends along the outer flat face 101 of the body portion 96 of side plate 10 and an inwardly extending upper flange portion 102 which is integrally formed with outer portion 100. The portion 102 overlies the upper slotted face 103 of plate 10. The indexing element 85 is releasably attached to the plate by means of an indexing element fastening assembly 183 in a manner similar to the attachment employed for securing the bracket 79 to rib 80. Thus bolts 104 are provided which pass through the upper flange 102 of the indexing element 85 and through the slot 93 in plate 10 to engage a shoe 105 which is disposed in the hollow of the base plate 10.

Side wall panel 12 is secured to rib 80 by means of screws 106. Below rib 80 the lower portion 107 of the panel 12 is offset slightly inwardly from the general vertical plane of the panel and is folded inwardly and upwardly to provide a depending rail or catch 108 for door 99 which is spaced outwardly of the ends of the partitions. Door 99 extends upwardly from its lower resting position on flange 95 of rail 10 to its upper end 110 and overlies the outer face of the catch 108 thereof. A latch mechanism 112 which consists of a rigid member 114 that is rigidly attached to the inner face of the door 99, a slotted latch element 115 which is vertically slidably secured to member 114 and adapted to engage catch 108, and a compression spring 113 which is compressible between members 114 and element 115 is provided for securing the door in place. The door 99 is removed from the position shown by lifting the door 99 by means of handle 116. This compresses the spring 113 between the respective flanges associated with member 114 and element 115 respectively and permits the lower end 98 of the door to be pulled over rail 97 whereby the door may be physically detached from the van body.

FIGS. 8 through 11 generally illustrate the bottom construction of the single walled and master partitions and also illustrate the means employed for releasably securing the partitions to the bottom plates, such as plate 10.

Figure 11:
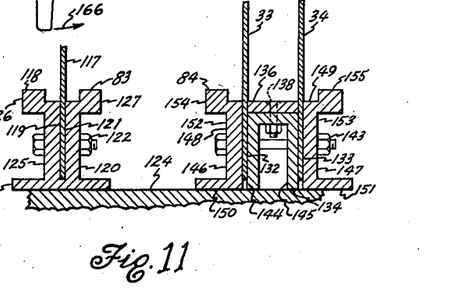
FIG. 11 is a section view along the line 11—11 of FIG. 8.

With respect to single walled partition 22, the compartment dividing sheet 117 thereof is disposed along its bottom edge 119 in a vertical slot 121 of a rigid cross member or framing element 120 which is releasably secured to the respective plates, such as plate 10, at its opposite ends. As shown in FIG. 11, cross member 120 has a bottom flange 123 which rests on the floor 124 of flat bed 11 and an upstanding vertically slotted web 125 which is integrally formed therewith. Fasteners, such as the bolt and nut 122 are employed in securing the sheet 117 in the slot 121 of the member 120. The top portion of member 120 is provided with forwardly and rearwardly projecting flanges 127 and 126 respectively which extend upwardly at the outer edges thereof to form can supporting rails 83 and 118 respectively.

To facilitate connecting the rigid cross member 120 to the plates, such as plate 10, the end portions 128 of the member 120 have the web 125 and bottom flange 123 removed so that, for example, the upper flanges 126 and 127 extend outwardly over the slotted top face 103 of plate 10. Thereat the member 120 is secured to the plate 10 by plate fastener means which comprise bolts 129 and 130 which pass through the flanges 126 and 127, respectively, and a nut forming shoe 131 which is disposed within the hollow portion 99 of the plate 10 and which is threadedly engaged by the bolts.

Figures 8, 9:
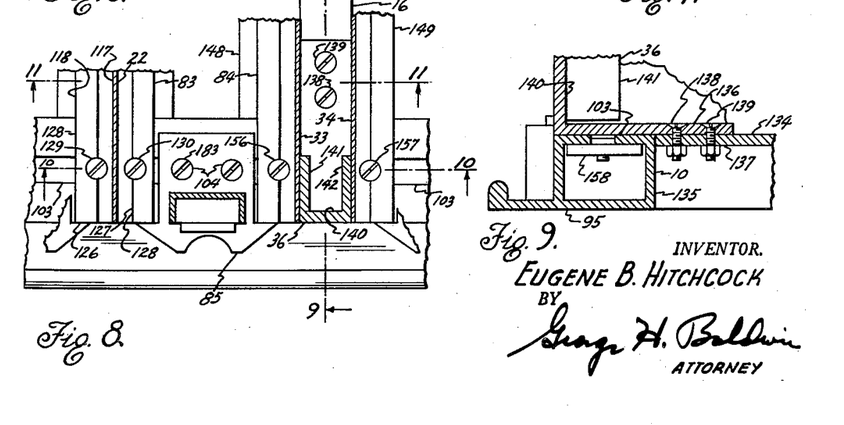
FIG. 8 is a section view along the line 8—8 of FIG. 6.
FIG. 9 is a section view along the line 9—9 of FIG. 8.
Figure 10:
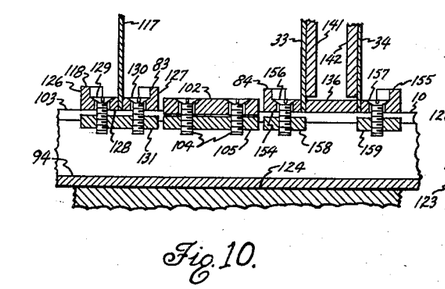
FIG. 10 is a section view along the line 10—10 of FIG. 8.

With respect to master partition 16, the sheets 33 and 34 are disposed along their bottom edges, 132 and 133, respectively, on opposite sides of a transversely extending inverted U-shaped member or framing element 134. The end portion 137 of member 134 butts against the inner face 135 of plate 10 as shown in FIG. 9 and a plate 136 which overlies the end portion 137 of the member is rigidly secured thereto as by means of nuts and bolts 138 and 139. Plate 136 is an integral extension of the web 140 of upstanding post forming U-shaped member 36, and is formed by removing the lower end portions of the flanges 141 and 142 and bending the web 140 inwardly to overlie the slotted face 103 of plate 10 and the end portion 137 of cross member 134, all of which is best illustrated in FIG. 9 and 10. The sheets 33 and 34 are secured to member 134 by means of fasteners, such as bolt and nut 143, which extend through the bottom portions 132 and 133 of the sheets, the depending flanges 144 and 145 of the member 134 and also through the webs 146 and 147 of transversely extending cross members 148 and 149. Cross members 148 and 149 may be formed by cutting members, like cross member 120, into two portions along the plane of the slot therein. Cross members 148 and 149 have bottom flanges 150 and 151 which rest upon the floor 124 of flat bed 11 and upstanding webs 152 and 153 which are removed at the ends of the members so that the respective upper rail forming flanges 154 and 155 project laterally outwardly and overlie the slotted upper face 103 of plate 10. Thereat members 148 and 149 are secured to the plate 10 by means of releasable plate fasteners. Thus bolts 156 and 157 pass through the respective flanges 154 and 155 to engage the respective shoes 158 and 159 in the hollow 94 of plate 10.

Figure 12:
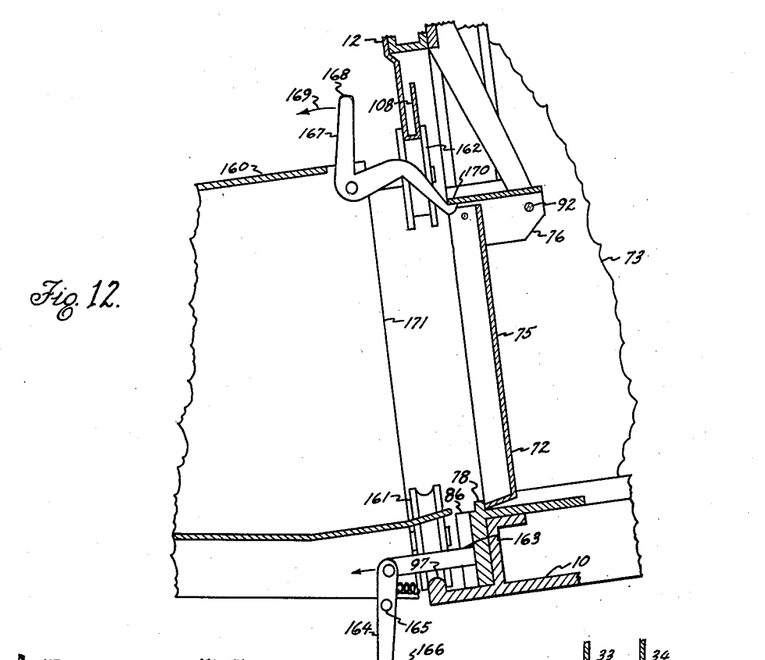
FIG. 12 is a section view similar to FIG. 7 showing mechanism employed in unloading the cans from the respective compartments.

The method employed for the unloading of the compartments is illustrated in FIG. 12 wherein it will be seen that the van body is preferably tilted toward the side during unloading. An open ended boot 160 is provided to receive the cans as they roll out the opening 72 in the compartment 73. The boot 160 is supported on the side edge of the van body by means of a pulley type wheel 161 which rests on the boot rail 97 of the base plate 10. The upper portion of the boot is also provided with a pulley type wheel 162 which engages the depending catch portion 103 of the side wall panel 12. The boot 160 may be passed from one compartment to the next to receive the cans therein and is oriented before the respective compartment by means of a detent 163 which fits into the socket forming recess 86 of indexing element 85. Detent 163 is pivotally attached to the upper end of a releasing arm 164 which is in turn pivotally attached as at 165 to the lower portion of boot 160. By moving the lower end of arm 164 in the direction of arrow 166 and detent 163 is withdrawn from the socket fixing recess 86 and the boot can be rolled along rail 97 to the next compartment and oriented with respect to the opening therewith by means of the indexing element thereat and the detent 163.

The gate 75 to compartment 73 is released by means of a lever 167 which is pivotally attached to the upper end portion of boot 160. The lever 167 is adapted at its forward end to engage the underside of hinge 76 at a point which is outwardly of its pivotal connection 92 to bracket 79. By pulling the handle 168 of the lever 167 in the direction of arrow 169 the outer portion 170 of the hinge 76 is raised and this causes gate 75 to be raised and become disengaged from the upstanding and gate retaining lip 78 of indexing element 85. As such the weight of the cans against the gate 75 will cause the gate to pivot outwardly into the boot and the cans are thereby permitted to pass through the compartment opening 72 into the open end 171 of boot 160 by gravity.

The compartmented apparatus may be assembled in various ways. A convenient method is to first attach the plate fastening assemblies and rod connectors to the assembled partitions so that the shoes thereof will freely pass into the end of the base plate with the bolt projecting through the slot of the base plate and in loose engagement with the rails of the partitions. It will be understood, of course, that the connectors for the double-walled partitions are positioned on the partitions during their assembly. Thereafter the partitions may be successively placed upon the floor of the bed in an upright position by passing the bolts of the partition attached plate fastening assemblies into the end of the slot of the base plates and therealong until the partitions are properly spaced one from the next on the bed. The fastening assemblies may then be adjusted to secure the partitions to the base plate. The intermediate indexing elements are respectively placed on the base plates between each successively added partition by passing the bolt of the plate fastening assembly, which is first attached to the indexing elements, along the slot of the base plate in a similar manner. As the partitions are placed upon the bed the various sections of the rods may be inserted through the connectors and successively interconnected in end to end relation. Thereafter the connectors may be tightened so as to fix the partitions in place between the opposite sides of the structure. After all but one end partition have been secured to the base plates and to the rods, the rib fastening assemblies may be loosely attached to the partitions and the ribs passed along the ends of the partitions so as to engage the shoes of the aligned rib fastening assemblies within the respective hollow portions of the rib. As this is done the shoes of the gate bracket fasteners may be similarly engaged by the ribs. After tightening the rib fastening assemblies and gate bracket fasteners, the end partition may be attached and the side wall panels may be secured to the ribs and the gates attached to the brackets. Thereafter the doors may be added to the structure.

Once the apparatus is assembled partitions may be added or removed from either end of the structure by removing the respective end master partitions. To decrease the spacing between adjacent partitions and to add partitions, the rib fastening assemblies, the plate fastening assemblies and the tie rod connectors of the partitions are first loosened and an end partition removed. The indexing element fasteners and bracket fastening assemblies are also loosened at this time. Thereafter the partitions, the indexing elements and gate brackets are slid along the slots of the respective base members rods and ribs until the desired closer proximity is attained. Then the respective fastening assemblies and connectors are tightened to fixedly secure the elements in the compartmented structure. Thereafter the desired number of partitions together with the associated gate assemblies and indexing elements are added and the end partion replaced.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A can carrying assembly comprising a bed having opposite side edges, a plural compartment structure mounted on said bed including movable upright partitions extending transversely of said bed and spaced each from the next thereby defining respective compartments extending between adjacent said partitions, and elongated means extending longitudinally of and spaced above said bed for maintaining said partitions in rigid adjustable spaced relationship, said elongated means being releasably attached to each of said partitions, each of said partitions comprising a sheet member having opposite faces and having an end edge disposed adjacent one of said side edges of said bed, an elongated rod extending through said sheet members inwardly of said sheet end edges, means rigidly adjustably attaching said sheet members to said rod, can supporting means attached to said sheet member along the bottom thereof and extending outwardly from each of the opposite faces of said sheet member for supporting cans in the respective compartments adjacent the partition, and can retaining means attached to said sheet member along said end edge of said sheet member and extending outwardly from each of the opposite faces of said sheet member for retaining cans in the respective compartments adjacent the partition, said can retaining means of said partitions including lower ends disposed spacedly above said can supporting means and thereby defining below said lower ends respective lateral openings into each of said compartments, and gates attached to said structure, each of said gates being disposed in closing position in a respective one of said lateral openings.

2. A can carrying assembly comprising a bed having opposite side edges, a plurality of upright movable partitions extending transversely of said bed and spaced each from the next thereby defining respective compartments extending between adjacent said partitions, said partitions having respective ends disposed adjacent one of said opposite side edges, a plurality of elongated ribs vertically spaced one from the next and releasably attached to each of said partitions at respective said ends for maintaining said partitions in adjustable spaced relationship, each of said partitions comprising a sheet member having opposite faces and opposite ends, a plurality of elongated rods extending through said sheet members inwardly of said sheet member ends, means releasably attaching said sheet members to said rods for maintaining said sheets in rigid internal adjustable spaced relationship, a pair of can supporting rails attached to said sheet member and extending along the bottom of said sheet member, said rails extending outwardly from respective opposite faces of said sheet member for supporting cans in the respective compartments adjacent the partition, and a pair of vertically extending flanged members attached to one end of said sheet member for retaining cans in the respective compartments adjacent the partition, said flanged members extending outwardly from the respective opposite faces of said sheet member, said flanged members of said partitions terminating spacedly above said rails and defining respective lateral openings into each of said compartments, and a plurality of gates respectively disposed in closing position in each one of said lateral openings.

3. A can carrying assembly comprising a bed having opposite side edges, a plurality of upright movable partitions extending transversely of said bed and spaced each from the next thereby defining respective compartments extending between adjacent said partitions, said partitions having respective ends disposed adjacent one of said side edges, a plurality of elongated ribs vertically spaced one from the next and releasably attached to each of said partitions at said ends for maintaining said partitions in adjustable spaced relationship, a plurality of elongated rods extending through said partitions inwardly of said partition ends and releasably attached to each of said partitions for maintaining said partitions in rigid internal adjustable spaced relationship, each of said partitions comprising a sheet member having opposite faces and having an end disposed adjacent said one of said opposite side edges, a pair of can supporting rails attached to said sheet member and extending along the bottom of said sheet member, said rails extending outwardly from the respective opposite faces of said sheet member for supporting cans in the respective compartments adjacent the partition, and a pair of vertically extending flanged members attached to said end of said sheet member for retaining cans in the respective compartments adjacent the partition, said flanged members extending outwardly from the respective opposite faces of said sheet member, said flanged members of said partitions including respective lower ends disposed spacedly above said rails and defining thereby below said lower ends respective lateral openings into each of said compartments, and a plurality of gates respectively disposed in closing position in each one of said lateral openings.

4. A can carrying assembly comprising an elongated body member having a floor and a side edge, an elongated hollow member mounted on said floor and extending along said side edge, said hollow member having an upper face with a slot therein communicating with said hollow and extending along said side edge, a plurality of individually movable upstanding partitions resting on said floor and extending transversely of said body member, said partitions having respective ends disposed adjacent said side edge and being spaced one from the next longitudinally of said body member to thereby define respective compartments extending between adjacent said partitions, an elongated rib releasably attached to each of said respective ends of said partitions, each of said partitions comprising a sheet member having opposite faces and having an end disposed adjacent said hollow member, a pair of can supporting rails attached to the bottom of said sheet member, said rails extending outwardly from respective faces of said sheet member and having respective end portions overlying said upper face of said hollow member, and a pair of can retaining flanged members attached to the end of said sheet member, said flanged members extending outwardly from respective faces of said sheet member and terminating at lower end portions disposed spacedly above said end portions of said rails, releasable means extending through said slot and through respective said end portions of said rail for adjustably attaching said partitions to said hollow member, said lower end portions of the partition flanged members and said end portions of the partition rails defining openings therebetween into respective said compartments, and a plurality of gates respectively disposed in closing position with respect to each one of said openings.

5. A can carrying assembly comprising an elongated body member having a side edge, a hollow base member mounted on said body member and extending along said side edge, an elongated hollow rib member extending longitudinally of said body member spacedly above said base member, a plurality of can supporting rail members on and extending across said body member, said rail members having respective end portions overlying said base member, releasable means extending through said end portions and into the hollow of said base member for adjustably attaching said rail member to said base member, a plurality of elongated vertically extending double flanged members having respective lower end portions disposed spacedly above respective said rail members, said double flanged members having respective outer flanges disposed against said rib member, releasable means extending through said outer flanges into the hollow of said rib member for attaching said rib member to said double flanged members, upright sheet members spaced one from the next supported on and extending across said body member, each of said sheet members having a bottom portion attached to a respective rail member and an end portion attached to a respective double flanged member, and a plurality of gates respectively disposed between adjacent said sheet members adjacent the said end portions thereof and below said lower end portions of said flanged members.

6. A can carrying van body comprising an elongated flat body member having a side edge, a hollow base member mounted on said body member and extending along said side edge, said base member having an upper face with a slot therein extending along said side edge and communicating with said hollow, a plurality of partitions respectively spaced one from the next longitudinally of said body member, each of said partitions comprising an upstanding sheet having opposite faces, a pair of can supporting rails attached to said sheet along the bottom thereof and extending outwardly of respective said opposite faces, said rails having respective ends overlying said face of said base member and a pair of vertically extending can retaining flanged members attached to said sheet spacedly above ends of said can supporting rails, said flanged members being disposed against respective said opposite faces of said sheet, a hollow elongated rib extending along said side edge spacedly above said base member, said rib having an inner slotted face disposed against said flanged members and adjustable means for attaching said rib to said partitions including a member extending through said slot of said plate.

7. In a can carrying assembly having parallel partitions respectively spaced one from the next, a plurality of elongated rods extending between and through said partitions, fastening means carried by said rods for adjustably attaching said partitions in spaced relationship to said rods, a plurality of vertically extending flanged members, each of said flanged members being attached to an end portion of a respective one of said partitions, an elongated hollow rib horizontally disposed against each of said flanged members, and releasable fastener means passing through said flanged members and into said hollow of said rib for adjustably attaching said partitions to said rib.

8. A can carrying assembly comprising an elongated bed having opposite side edges, a plural compartment structure mounted on said bed including movable upright partitions extending transversely of said bed and spaced each from the next thereby defining respective compartments extending between adjacent said partitions, said partitions having respective ends disposed adjacent one of said opposite side edges, a hollow member extending longitudinally of and spacedly above said bed, said hollow member having a side face with a slot therethrough continuous from substantially one end to the other of said structure, can supporting means detachably secured to said partitions along the bottoms thereof for supporting cans in the respective compartments, can retaining means attached to said partitions along said ends of said partitions for retaining cans in the respective compartments, said can retaining means being provided with openings registering with said slot of said hollow member, releasable means extending through said slot and said opening of said can retaining means adjustably attaching said partitions to said hollow member in predetermined adjacent positions therealong, said can retaining means of said partitions terminating at respective lower ends disposed spacedly above said can supporting means and defining below said lower ends respective lateral openings into each of said compartments, and gates attached to said structure, each of said gates being disposed in closing position in a respective one of said lateral openings.

9. The can carrying assembly as defined in claim 8 further comprising an elongated rod extending through said partitions and means rigidly adjustably maintaining said partitions in spaced relationship along said rod.

10. The can carrying assembly as defined in claim 8 wherein each said gate includes an upper end and a lower end, and comprising means for adjustably releasably attaching said upper end to said hollow member in selectable positions therealong an means for releasably locking said lower end of each said gate to said structure.

11. A can transporting container comprising a plurality of rectangular parallel and upstanding sheet material partitions having vertical side edge portions, rigid can-retaining partition framing elements attached along said side edge portions of each said partition, a plurality of said elongated structural members extending horizontally along said partitions and engaging said framing elements, means releasably locking said framing elements to said structural members in selected adjustable positions therealong whereby the adjacent said side edge portions of each said partition are maintained parallel, each said partition further having a lower edge portion, rail elements respectively disposed on opposite sides of each said partition, said rail elements extending along said lower edge portion of each said partition and being attached thereto whereby the adjacent said lower edge portion of each said partition is maintained parallel, one of said framing elements of each said partition being interrupted adjacent the lower side edge portion of said partition to provide a passageway for emptying cans disposed between each adjacent pair of said partitions, and a respective gate disposed between said partitions of each pair closing the respective said passageway and releasable means connected to each said gate for supporting each said gate in selectable positions between said partitions of each pair.

12. The can transporting container as defined in claim 11 further comprising means disposed between said partitions of each pair intermediate said side edge portions thereof for positioning and maintaining said partitions in rigid internal spaced and parallel relationship.

References Cited in the file of this patent

UNITED STATES PATENTS

| | | |
|---|---|---|
| 1,519,825 | Douglass | Dec. 16, 1924 |
| 1,586,485 | Swanson | May 25, 1926 |
| 1,736,057 | Smith | Nov. 19, 1929 |
| 2,124,500 | Taylor | July 19, 1938 |
| 2,272,682 | Srodulski | Feb. 10, 1942 |
| 2,329,815 | Atwood | Sept. 21, 1943 |
| 2,380,379 | Atwood | July 31, 1945 |
| 2,928,522 | Anderson | Mar. 15, 1960 |

UNITED STATES PATENT OFFICE
CERTIFICATE OF CORRECTION

Patent No. 3,070,398                                              December 25, 1962

Eugene B. Hitchcock

It is hereby certified that error appears in the above numbered patent requiring correction and that the said Letters Patent should read as corrected below.

Column 4, line 37, for "abuts" read -- butts --; lines 51 and 65 and column 5, lines 45 and 75, for "members" read -- member --; column 4, line 74, for "openings" read -- opening --; column 7, lines 8 and 9, for "compartment" read -- compartments --; line 14, for "and" read -- the --; column 10, line 23, after "said", second occurrence, insert -- double --; line 30, after "of" insert -- movable --; column 11, line 21, for "an" read -- and --; column 12, lines 15 and 16, for "partions" read -- partitions --.

Signed and sealed this 2nd day of July 1963.

(SEAL)
Attest:

ERNEST W. SWIDER                                      DAVID L. LADD
Attesting Officer                                              Commissioner of Patents